US010972907B2

(12) United States Patent
Zhao

(10) Patent No.: US 10,972,907 B2
(45) Date of Patent: Apr. 6, 2021

(54) METHOD AND SYSTEM FOR BLUETOOTH-BASED MULTI-END TO MULTI-END COMMUNICATION

(71) Applicant: Fengping Zhao, Shanghai (CN)

(72) Inventor: Fengping Zhao, Shanghai (CN)

( * ) Notice: Subject to any disclaimer, the term of this patent is extended or adjusted under 35 U.S.C. 154(b) by 0 days.

(21) Appl. No.: 16/939,106

(22) Filed: Jul. 27, 2020

(65) Prior Publication Data

US 2020/0359209 A1 Nov. 12, 2020

Related U.S. Application Data

(63) Continuation of application No. PCT/CN2018/078223, filed on Mar. 7, 2018.

(30) Foreign Application Priority Data

Jan. 29, 2018 (CN) .......................... 201810085527.7

(51) Int. Cl.
*H04W 12/00* (2021.01)
*H04W 80/02* (2009.01)
(Continued)

(52) U.S. Cl.
CPC ......... *H04W 12/033* (2021.01); *H04L 1/0008* (2013.01); *H04W 4/80* (2018.02);
(Continued)

(58) Field of Classification Search
None
See application file for complete search history.

(56) References Cited

U.S. PATENT DOCUMENTS

2009/0089366 A1 4/2009 Toth
2015/0046696 A1\* 2/2015 Zheng ............. H04W 12/04031
713/155

(Continued)

FOREIGN PATENT DOCUMENTS

CN 101611608 A 12/2009
CN 103458061 A 12/2013
(Continued)

*Primary Examiner* — Scott M Sciacca

(57) ABSTRACT

The invention provides a method and system for Bluetooth-based multi-end-to-multi-end communication, including: obtaining, through a short-term connection-oriented communication, a UUID of a device that needs to receive private data, corresponding the UUID to a private label according to a private label allocation table and storing the UUID in a mapping table within a broadcast host; and looking-up the mapping table, if data to be sent contains private information targeted for a specific receiving object group, then determining whether encryption is required; if encryption is required, then performing dynamical encryption based on the private label and proceeding to a step of Bluetooth broadcast payload sending; and performing corresponding non-private data hosting encapsulation or private data hosting encapsulation for the data to be sent and broadcasting the data. The invention not only satisfies the Bluetooth low energy specification, but also achieves many-to-many real-time communication, and includes a highly reliable encryption method.

8 Claims, 3 Drawing Sheets

(51) Int. Cl.
*H04W 4/00* (2018.01)
*H04W 12/033* (2021.01)
*H04W 4/80* (2018.01)
*H04L 1/00* (2006.01)
*H04W 12/06* (2021.01)
*H04W 24/08* (2009.01)
*H04W 12/71* (2021.01)

(52) U.S. Cl.
CPC .......... *H04W 12/06* (2013.01); *H04W 12/71* (2021.01); *H04W 24/08* (2013.01)

(56) References Cited

U.S. PATENT DOCUMENTS

2015/0312885 A1  10/2015  Pang
2019/0349426 A1*  11/2019  Smith .................. H04L 67/104

FOREIGN PATENT DOCUMENTS

| | | |
|---|---|---|
| CN | 105659520 A | 6/2016 |
| CN | 105893871 A | 8/2016 |
| DE | 202011109260 U1 | 1/2012 |

\* cited by examiner

METHOD AND SYSTEM FOR BLUETOOTH-BASED MULTI-END TO MULTI-END COMMUNICATION

CROSS-REFERENCE TO RELATED APPLICATIONS

This application is a continuation of International Patent Application No. PCT/CN2018/078223, filed on Mar. 7, 2018, which claims the benefit of priority from Chinese Patent Application No. 201810085527.7, filed on Jan. 29, 2018. The content of the aforementioned applications, including any intervening amendments thereto, is incorporated herein by reference.

TECHNICAL FIELD

The present invention relates to the field of communication technology, and in particular, to a method and system for Bluetooth-based multi-end to multi-end communication. In particular, the present invention relates to a method and system for multi-end to multi-end communication with high-reliability based on Bluetooth low energy (BLE).

BACKGROUND OF THE PRESENT INVENTION

At present, Bluetooth low energy is mainly used in the one end to one end (one-to-one for short) or one end to multi-end (one-to-many for short) communication scenarios between master and slave nodes, but when multi-end to multi-end communication is required (many-to-many for short), it is needed to use time-sharing one-to-one intermittent polling short-term connection, or to combine active one end to multi-end (such as GATT protocol) improved intermittent polling short-term connection to achieve many-to-many communication at the business level and follow the low power consumption design. There are also application protocols that simply use broadcast to trigger notifications, such as IBeacon, combined with a specific mobile-end application to obtain agreed information from a designated third-party cloud.

However, the limitation of polling connection is that the number of connection terminals is in a close linear inverse relationship with the unit time required to complete a single communication, and the time-sharing intermittent design will frequently initiate connecting operations and disconnecting operations. Although the connection-oriented communication will exclusively occupy the channel and guarantee good security, the overhead of the connecting and disconnecting operations is not only time-consuming, but also brings higher system power consumption overhead. The simple broadcast communication triggered notification is to trigger a single associated one-way data through the associated registered broadcast ID, and there is no new information transmission that is continuously generated of real payload, that is, it is not a real continuous communication.

The more serious defect is that in continuous and disordered many-to-many communication, time-sharing polling cannot efficiently associate the information pieces to be sent with the connected and unconnected peer nodes. Although theoretically successful history of sending and receiving is recorded by establishing a transmission mapping table, taking into account the relative displacement between wireless communication nodes and the variability of the in-and-out signal range, this is achieved in the topology of five or more master-slave nodes. The more nodes there are, the worse the continuity, the sequence of completeness within sending and receiving of information pieces. The effect of directly initiating the transmission of the payload information through Bluetooth broadcasting is that the broadcast is sent to all objects within the signal range extensively, and there is no distinction between different receivers and no distinction in the treatment of the payload that is about to be sent.

SUMMARY OF THE PRESENT INVENTION

In view of the defects in the prior art, the present invention aims to provide a method and system for Bluetooth-based multi-end to multi-end communication.

A method for Bluetooth-based multi-end to multi-end communication provided in accordance with the present invention includes:

a step of authorizing and monitoring private data group communication: obtaining, through a short-term connection-oriented communication, a UUID of a device that needs to receive private data, corresponding the UUID to a private label according to a private label allocation table and storing the UUID in a mapping table within a broadcast host; and looking-up the mapping table, if data to be sent contains private information targeted for a specific receiving object group, then proceeding to a step of private communication encryption, otherwise proceeding to a step of Bluetooth broadcast payload sending;

the step of private communication encryption: determining whether encryption is required; if encryption is required, then performing dynamical encryption based on the private label and proceeding to the step of Bluetooth broadcast payload sending; and if encryption is not required, proceeding to the step of Bluetooth broadcast payload sending;

the step of Bluetooth broadcast payload sending: performing corresponding non-private data hosting encapsulation or private data hosting encapsulation for the data to be sent and broadcasting the data.

Preferably, the step of Bluetooth broadcast payload sending specifically includes: performing hosting padding and payload merging in broadcast host protocol reserved extension bits and spare non-reserved bits.

Preferably, an encryption scheme in the step of private communication encryption is reflected in a bit of Encrypted Mark Key of a broadcast host protocol which is sent along with the data to be sent.

Preferably, in the step of authorizing and monitoring private data group communication: looking-up the mapping table, if data to be sent contains private information targeted for a specific receiving object group and in case that the private label is valid, then proceeding to the step of private communication encryption according to a filtering rule required by the specific receiving object group and proceeding to the step of Bluetooth broadcast payload sending.

Preferably, conditions that the private label is valid include: compliance with rules; in activated state; objective existence in a physical domain of a signal range.

A system for Bluetooth-based multi-end to multi-end communication provided in accordance with the present invention includes:

a module of authorizing and monitoring private data group communication, configured for: obtaining, through a short-term connection-oriented communication, a UUID of a device that needs to receive private data, corresponding the UUID to a private label according to a private label allocation table and storing the UUID in a mapping table within a broadcast host; and looking-up the mapping table, if data to be sent contains private information targeted for a specific receiving object group, then proceeding to a module of private communication encryption, otherwise proceeding to a module of Bluetooth broadcast payload sending;

the module of private communication encryption, configured for: determining whether encryption is required; if encryption is required, then performing dynamical encryption based on the private label and proceeding to the module of Bluetooth broadcast payload sending; and if encryption is not required, proceeding to the module of Bluetooth broadcast payload sending;

the module of Bluetooth broadcast payload sending, configured for: performing corresponding non-private data hosting encapsulation or private data hosting encapsulation for the data to be sent and broadcasting the data.

Preferably, the module of Bluetooth broadcast payload sending specifically includes: performing hosting padding and payload merging in broadcast host protocol reserved extension bits and spare non-reserved bits.

Preferably, an encryption scheme in the module of private communication encryption is reflected in a bit of Encrypted Mark Key of a broadcast host protocol which is sent along with the data to be sent.

Preferably, in the module of authorizing and monitoring private data group communication: looking-up the mapping table, if data to be sent contains private information targeted for the specific receiving object group and in case that the private label is valid, then proceeding to the module of private communication encryption according to a filtering rule required by the specific receiving object group and proceeding to the module of Bluetooth broadcast payload sending.

Preferably, conditions that the private label is valid includes: compliance with rules; in activated state; objective existence in a physical domain of a signal range.

As compared to the prior art, the present invention has the following beneficial effects:

the invention adopts broadcast in Bluetooth low energy, which is not connection-oriented, as communication transmission path, and each communication end can be either a broadcast initiator or a broadcast receiver. Differentiated information is transmitted to different receiving object groups by adding distinguishing marks in the general broadcast paths. The added distinguishing marks can provide filtering and screening for the private data received by the receivers, and also can guarantee the dynamic privacy and encryption requirements of the private data. It not only meets the Bluetooth low energy specification, but also achieves many-to-many real-time communication, and contains highly reliable encryption schemes. It also avoids the untargeted nature of broadcast communication and improves the concurrent throughput of many-to-many communication in the same time slice. Non-polling real-time many-to-many low-power Bluetooth communication among up to one hundred ends is achieved; data in the communication common channel can be classified and encrypted to ensure safety, reliability and compatibility with specific standards.

BRIEF DESCRIPTION OF THE DRAWINGS

By reading the detailed description of the non-limiting embodiments with reference to the following drawings, other features, objects, and advantages of the present invention will become more apparent.

DETAILED DESCRIPTION OF THE PRESENT INVENTION

The present invention will be described in detail below in conjunction with specific embodiments. The following embodiments will help those skilled in the art to further understand the present invention, but do not limit the present invention in any form. It should be noted that, those of ordinary skill in the art can make several changes and improvements without departing from the concept of the present invention. These changes and improvements fall in the scope of the present invention.

Figure 1:
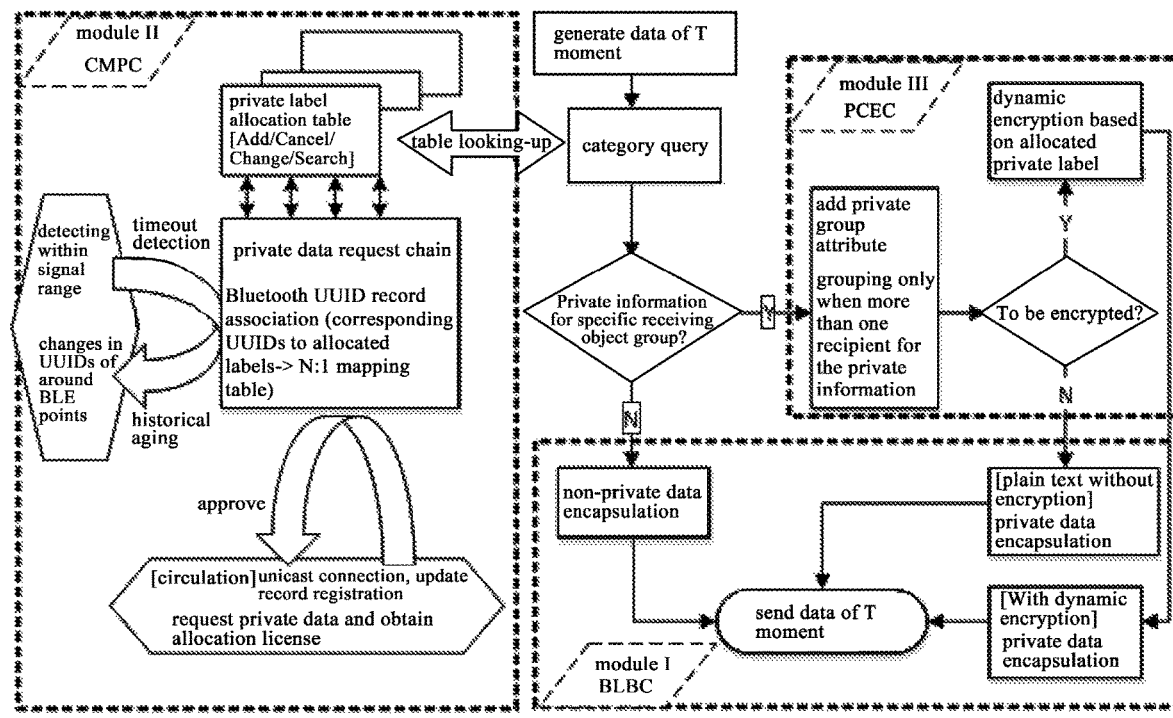
FIG. 1 is a flowchart of the present invention.

As shown in FIG. 1, a method for Bluetooth-based multi-end to multi-end communication provided by the present invention includes the following steps:

a step of authorizing and monitoring private data group communication (CMPC): obtaining, through a short-term connection-oriented communication, a UUID of a device that needs to receive private data, corresponding the UUID to a private label according to a private label allocation table and storing the UUID in a mapping table within a broadcast host; and by looking-up the mapping table, if data to be sent contains private information targeted for a specific receiving object group, then proceeding to a step of private communication encryption, otherwise proceeding to a step of Bluetooth broadcast payload sending;

the step of private communication encryption (PCEC): determining whether encryption is required; if encryption is required, then performing dynamical encryption based on the private label and proceeding to the step of Bluetooth broadcast payload sending; and if encryption is not required, proceeding to the step of Bluetooth broadcast payload sending;

the step of Bluetooth broadcast payload sending (BLBC): performing corresponding non-private data hosting encapsulation or private data hosting encapsulation for the data to be sent and broadcasting the data.

The principle is as follows: the data source continuously generates data, and the data at time moment T needs to be sent to multiple receiving ends. The data is handed over to CMPC category query to identify whether the data needs to be encrypted or whether the data is targeted for a specific receiving group. According to the query result, if it is determined that there is encryption or the data is targeted for the receiving group, the data is handed over to a PCEC module for data privatization and encryption packaging. If plaintext data is only needed to be sent to all recipients around, packaging is performed without modifying the data through PCEC. Private plaintext packages, private encrypted text packages, or public plaintext packages will be handed over to BLBC, so as to be buried in a BLE broadcast data packet corresponding to the time moment T according to different hosting approaches.

The step of Bluetooth broadcast payload sending specifically includes: performing hosting padding and payload merging in broadcast host protocol reserved extension bits and spare non-reserved bits. Design is made based on the characteristics of BLE (abbreviation of Bluetooth Low Energy) broadcasting and by taking the non-connection-oriented broadcasting as the basis for data sending and receiving. At present, this feature is only used for BLE to broadcast local identification and status information to surroundings, which is low power consumption announcement information. The substantive information is acquired by announcing labels so as to trigger the receiver to pull through a third-party cloud, and BLE payload used for announcing is limited. Therefore, with respect to the payload processing in the present invention, hosting payload is designed based on the BLE broadcast announcement protocol.

Figure 2:
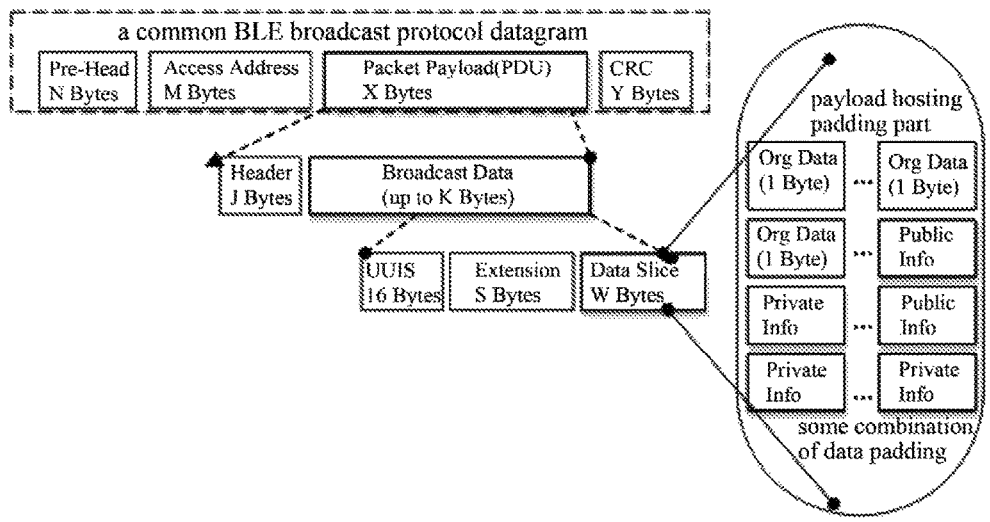
FIG. 2 is a schematic diagram of the hosting communication design of the common BLE broadcast protocol in accordance with the present invention.

FIG. 2 shows a process of decomposing a common BLE broadcast protocol datagram. Some bytes in PDU (packet payload) part constitute a space available for hosting, and other parts cannot be changed to prevent data packets from being lost, disappearing, and occurring data errors during the communication. Each data packet of the host will be decomposed and hosting information will be added in the Data Slice part accordingly. The hosting information will not engulf all the original host information, that is, the Org Data marked in the drawing. According to the needs of the communication service, multiple pieces of host information will be copied and partially or completely filled into new information to be transmitted. The Public Info and Private Info marked in the drawing are data of this type. In this way, the receiver of the original data information will receive the information that was originally meant to be received without being affected, and will ignore the newly added data due to failing to resolve; however, specific receiver group can receive all the original data and the newly added data.

In FIG. 2, Public Info is a unit of public non-private hosting encapsulation, Private Info is a unit of private data hosting encapsulation, and Org Data is a unit of unpadded original host information.

Figure 3:
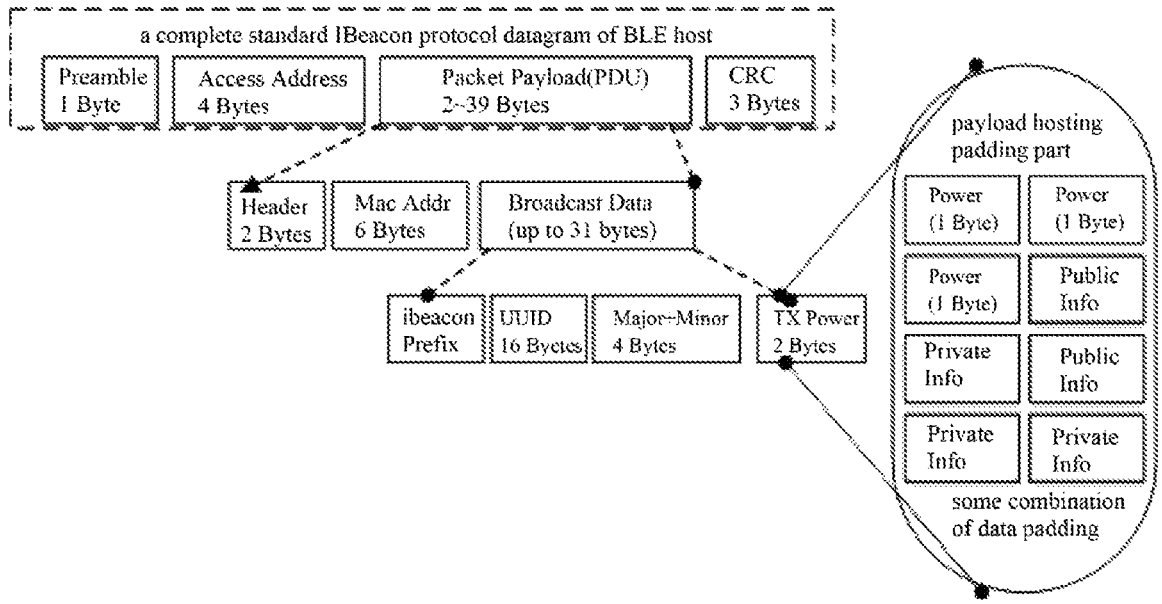
FIG. 3 is a schematic diagram of hosting padding based on IBeacon broadcast payload in accordance with the present invention.

Hosting padding and payload merging are performed in host protocol reserved extension bits and spare non-reserved bits. A single payload padding has a minimal of 1 byte and a maximum of M bytes (M confidence interval is [2, 12]) for continuous hosting padding, or other BLE application protocols in the industry such as IBeacon. Ibeacon is taken as the host protocol for example to illustrate hosting and idea of FIG. 2, and to illustrate the design of compatible standard protocol such as FIG. 3. The flow in FIG. 3 is basically the same as that in FIG. 2, and the difference is that the generalized content in FIG. 2 is instantiated in IBeacon protocol; but the flow, form, logic and methods are the same as FIG. 2, and will not be repeated here. (Taking IBeacon as the basis is for the reason that the specific compatibility of the method in this application is initiated from these hosting protocols, and then the effective compatibility with these protocols means coexistence with the protocols).

The above example illustrates how to reuse the frequently changing payload area in the host broadcast to host and propagate public and private data to multiple connectionless receivers within the signal coverage. Although the information carrying capacity of the payload for a single round is limited, several pieces of organizational streaming data can be received through the persistence of broadcasting. If BLE broadcast protocol of another host is used here instead, the same payload hosting approach is used to pad the high-frequency variable payload area in the broadcast unit data packet, in order to prevent the reused area from completely destroying the existing system (the index of destroying is that devices or software following original protocols cannot work normally, and cannot coexist with it to send and receive data); by introducing the identification and preferentially selecting a payload area that reserves null bits to perform data hosting padding, the impact on the original broadcast resolution and filtering burden is relieved, and compatibility and coexistence with the original protocol is ensured to the greatest extent.

In the step of authorizing and monitoring private data group communication: by looking-up the mapping table, if data to be sent contains private information targeted for a specific receiving object group and in case that the private label is valid, then proceeding to the step of private communication encryption according to a filtering rule required by the specific receiving object group and proceeding to the step of Bluetooth broadcast payload sending.

The step of authorizing and monitoring private data group communication is to obtain, by passing UUID information of the device that needs to receive private data through the short-term connection oriented communication, the UUID and other configuration and constraint attribute information, and then store the UUID and other configuration and constraint attribute information in the mapping table within the broadcast host device. When specific information is to be sent to a specific receiver group, and when the receiving group label is valid (validity: 1. compliance with rules; 2. in activated state; 3. objective existence in the physical domain of the signal range), then according to the filtering rule required by the private receivers, a private encapsulation method and PCEC encryption method in BLBC is activated to ensure that the broadcast information, although being sent to all receivers within the signal range, can only be resolved and decrypted by specific receivers, so that the corresponding information is only delivered to a specific receiver group.

When multiple UUIDs are mapped to a single encryption receiver rule, the mapping object can be either a single receiver or a group of multiple receivers. Receivers who receive dedicated broadcast information according to the single encryption receiver rule are called a private broadcast group. The information of private broadcast group will be recorded in a PCEC auxiliary marking area.

A private Bluetooth broadcast group can accommodate nearly a hundred receivers (theoretically close to the upper limit of broadcast receivers). A limited number of private broadcast groups can be stored on each host device, and the establishment and joining of private broadcast groups require one-to-one short-term connection-oriented unicast to sign in and register. Because each broadcast sender (host) also receives broadcast announcements from receivers within the signal range, private broadcast groups or broadcast group members that do not appear nearby for a long time will be preferentially cancelled and released when the internal storage space of the host device needs to be cleared. However, only a limited number of private broadcast groups are active and available at the same time, and by default a single private broadcast group works. Because the transfer of private information is achieved through targeted resolution and filtering by the receiver, the private broadcast group can coexist and be used with public non-private receivers.

The encryption in the private communication encryption step is reflected in the bit of Encrypted Mark Key in the broadcast host protocol, which is sent along with the data to be transmitted.

Figure 4:
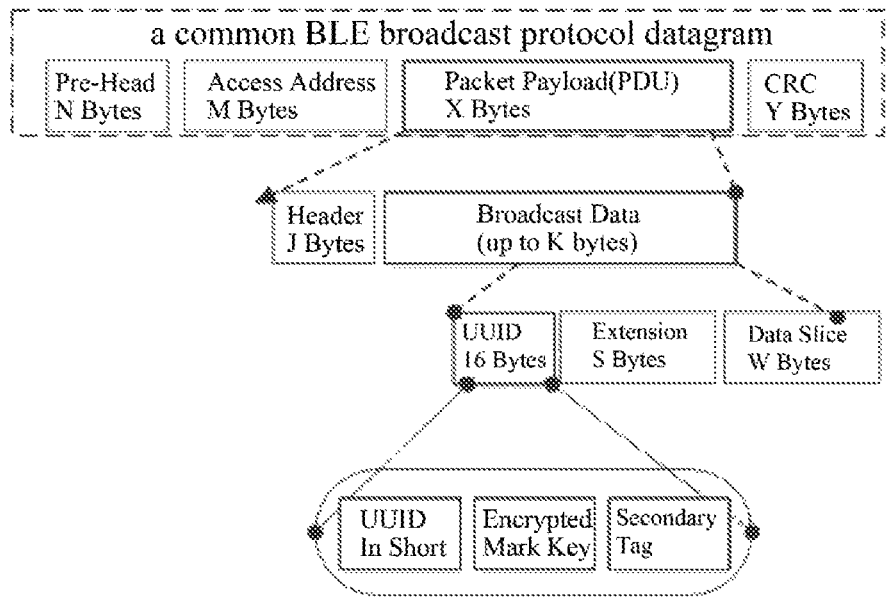
FIG. 4 is a schematic diagram of a compressed UUID long address of a common BLE broadcast, hosting encryption key and identification, in accordance with the present invention.

The classification and resolution of the hosting information in the payload are mainly performed by the broadcast receiving end, so the broadcast receiving end needs to know whether seemingly standard and common broadcast information is encrypted and the encryption basis, as shown in FIG. 4.

FIG. 4 shows a process of decomposing a common BLE broadcast protocol datagram. Some bytes in PDU part constitute a space available for hosting, and other parts cannot be changed to prevent data packets from being lost, disappearing, and occurring data errors during the communication. The UUID in the broadcast packet of each data packet of the host will be further processed (compressed, intercepted, and hosted). The UUID in the drawing has originally 16 bytes in length, and is compressed by encoding (the encoding scheme is not limited, and the purpose is to reduce the length from 16 bits to 8 bits or less) into short addresses, but these short addresses do not conflict, do not repeat, and are unique for specific time periods. The saved payload will be the newly added "EMK" encryption key identification and "ST" marking for coupling and decoupling the payload bit used by logic. Because the native broadcast protocol will also treat the modified UUID combination as a complete UUID, this does not affect normal use of the UUID.

In FIG. 4, Encrypted Mark Key is the key identifier used for encryption, Secondary Tag is the auxiliary mark used for coupling and decoupling logic, and UUID In Shot is the indented BLE UUID information. In this way, the receiving end can identify and process the broadcast information according to the received dynamic key identifier. Here, the encryption scheme at the broadcast transmitting end will be updated and reflected in the Encrypted Mark Key bit in FIG. 4 and will be broadcast together with the packet information. In this way, the receiving end can update the interpretation method according to the dynamic encryption basis hidden in the datagram, and filter and resolve the received broadcast information (usually using time as the trigger point for updating the encryption basis, but not only based on the time factor).

Before emphasizing the private communication relying on filter label and encryption, comparison is made to the broadcast frequency modulation payload technology. The first difference is that the broadcast base station only transmits information to many receivers in one direction. The broadcast base station relies on different frequency-band signals to carry different information. The receiver end itself cannot transmit information to the broadcast base station, and the different information can only be received by switching the frequency band. The label filtering and encryption in this application are not only for the data processing of the receiving end, but also for transferring tasks of filtering extraction and decryption from the broadcast transmitter to each receiving end. This is the most prominent role of the module, namely, label filtering and encryption is for safety but not only for safety. Only when this module works, there is no need to worry the question that data could not reach different receivers with differentiation when hosting the information. At the same time, in this design a broadcaster is not only a broadcaster but also a receiver, and the broadcaster can establish non-connection-oriented continuous communication with other broadcasters in a same way to transfer information.

Figure 5:
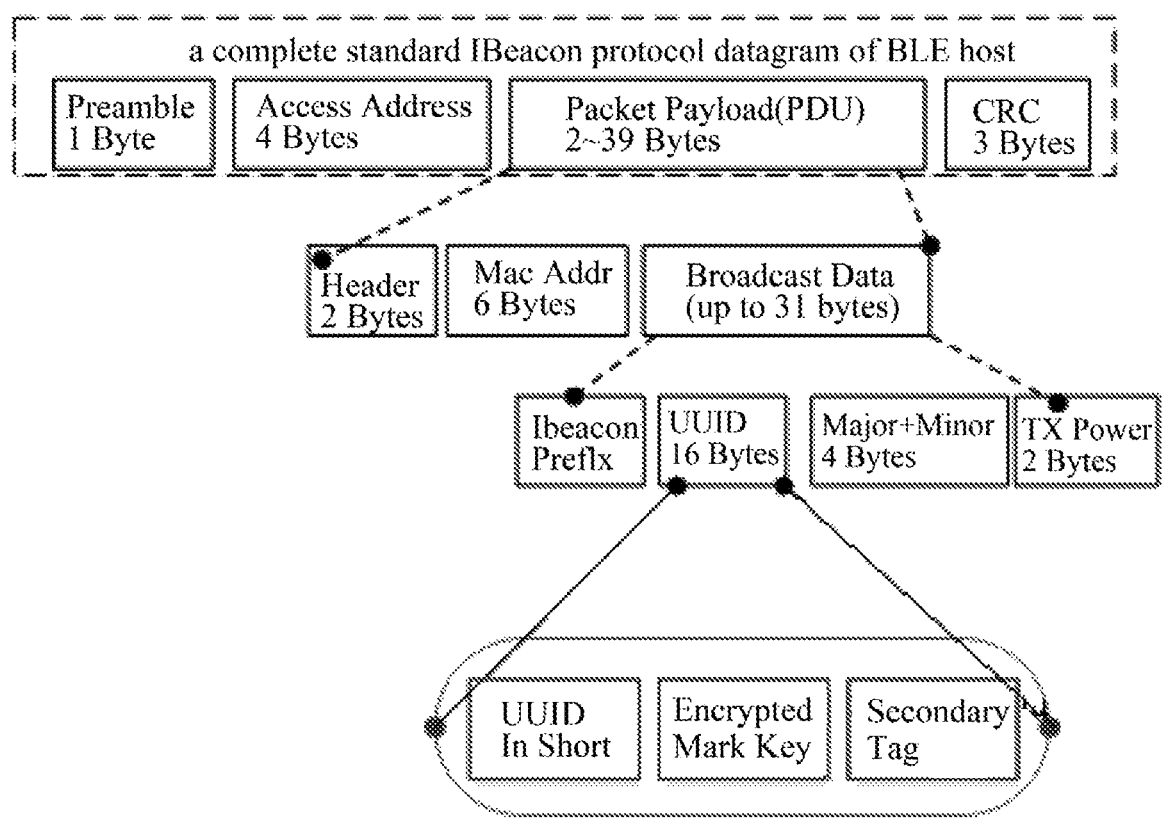
FIG. 5 is a schematic diagram of the design of the compressed and encrypted identification by taking IBeacon protocol as an example.

The flow in FIG. 5 is basically the same as the flow in FIG. 4, and the difference is that the generalized content in FIG. 4 is instantiated in IBeacon protocol; but the flow, form, logic and methods are the same as FIG. 4, and will not be repeated here. The hosting design of other non-standard BLE broadcasting protocols can also achieve the same communication effect by the combination of these three steps, combined with the above technical manners, as shown in FIG. 2 and FIG. 4.

Based on the forgoing method for Bluetooth-based multi-end to multi-end communication, the present invention further provides a system for Bluetooth-based multi-end to multi-end communication, including:

a module of authorizing and monitoring private data group communication, configured for: obtaining, through a short-term connection-oriented communication, a UUID of a device that needs to receive private data, corresponding the UUID to a private label according to a private label allocation table and storing the UUID in a mapping table within a broadcast host; and by looking-up the mapping table, if data to be sent contains private information targeted for a specific receiving object group, then proceeding to a module of private communication encryption, otherwise proceeding to a module of Bluetooth broadcast payload sending; by looking-up the mapping table, if data to be sent contains private information targeted for a specific receiving object group and in case that the private label is valid, then proceeding to the module of private communication encryption and the module of Bluetooth broadcast payload sending according to a filtering rule required by the specific receiving object group. The conditions for the validity of the private label include: compliance with rules; in activated state; objective existence in the physical domain of the signal range.

The module of private communication encryption, configured for: determining whether encryption is required; if encryption is required, then performing dynamical encryption based on the private label and proceeding to the module of Bluetooth broadcast payload sending; and if encryption is not required, proceeding to the module of Bluetooth broadcast payload sending; where an encryption scheme in the module of private communication encryption is reflected in a bit of Encrypted Mark Key of the broadcast host protocol which is sent together with the data to be sent.

The module of Bluetooth broadcast payload sending, configured for: performing hosting padding and payload merging in broadcast host protocol reserved extension bits and spare non-reserved bits; performing corresponding non-private data hosting encapsulation or private data hosting encapsulation for the data to be sent and broadcasting the data.

Using the above technical solutions, the present invention can:

1) quickly establish multi-end to multi-end BLE data communication. That is, at the same time, device A can establish BLE communication and intercommunicate data with devices a, b, and c, device B can also establish BLE communication and intercommunicate data with the devices a, b, and c, device C can also establish BLE communication and intercommunicate data with devices a, b, and c, and devices A, B, C can also establish BLE communication and intercommunicate data with each other.

2) the information sent by Bluetooth from multi-end to multi-end can be different. That is, at the same moment, the data that device A can send to devices a, b, and c is (a—"hello"; b, c—"bye"), the data that device B can send to devices a, b, and c is (a, b—"where are you"; c—"Ok") with the information being encrypted, and the data that device C can send to devices a, b, c is (a, b, c—"happy") without encrypting the information.

3) taking a common life as an example: after person A's mobile phone starts Bluetooth communication, communication may be performed through Bluetooth with Bluetooth bracelet a, Bluetooth appliance b, and Bluetooth headset c; person B's mobile phone also starts Bluetooth communication and is in a same activity area as person A; at this time, the mobile phone of the person B can also communicate with the Bluetooth bracelet a, the Bluetooth appliance b, and the Bluetooth headset c. At this moment, a, b, and c are not exclusively occupied by the person A. A mobile phone of person C starts Bluetooth communication, and is also in the same activity area as A and B at this time, so it can communicate with devices a, b, and c. Furthermore, the communication content between A, B, C and a, b, c can be different.

Those skilled in the art know that, in addition to implementing the system provided by the present invention and various devices, modules, and units thereof in a manner of pure computer-readable program codes, it is possible to achieve the same function as the system provided by the present invention and various devices, modules, and units thereof in the form of logic gates, switches, application specific integrated circuits, programmable logic controllers and embedded microcontrollers by perform logical programming based on the method steps. Therefore, the system provided by the present invention and various devices, modules, and units thereof can be regarded as a kind of hardware component, and the devices, modules, and units included therein for realizing various functions can also be regarded as structures inside the hardware component. The devices, modules, and units for realizing various functions can also be regarded as both software modules for implementing methods and structures inside the hardware component.

Specific embodiments of the present invention have been described above. It should be understood that the present invention is not limited to the above specific embodiments, and those skilled in the art may make various changes or modifications within the scope of the claims, which does not affect the essence of the present invention. In the case of no conflict, the embodiments of the present application and the features in the embodiments can be arbitrarily combined with each other.

What is claimed is:

1. A method for Bluetooth-based multi-end to multi-end communication comprising:
   a step of authorizing and monitoring private data group communication comprising: obtaining, through a short-term connection-oriented communication, a UUID of a device that needs to receive private data, corresponding the UUID to a private label according to a private label allocation table and storing the UUID in a mapping table within a broadcast host; and looking-up the mapping table to determine if data to be sent contains private information targeted for a specific receiving object group and if the private label is valid; and if yes, proceeding to a step of private communication encryption according to a filtering rule required by the specific receiving object group, otherwise proceeding to a step of Bluetooth broadcast payload sending;
   the step of private communication encryption comprising: determining whether encryption is required; if encryption is required, then performing dynamical encryption based on the private label and proceeding to the step of Bluetooth broadcast payload sending; and if encryption is not required, proceeding to the step of Bluetooth broadcast payload sending; and
   the step of Bluetooth broadcast payload sending comprising: encapsulating unencrypted data or encrypted data and broadcasting it.

2. The method for Bluetooth-based multi-end to multi-end communication according to claim 1, wherein the step of Bluetooth broadcast payload sending comprises: performing hosting padding and payload merging in broadcast host protocol reserved extension bits and spare non-reserved bits.

3. The method for Bluetooth-based multi-end to multi-end communication according to claim 1, wherein an encryption scheme in the step of private communication encryption is reflected in a bit of Encrypted Mark Key of a broadcast host protocol which is sent along with the data to be sent.

4. The method for Bluetooth-based multi-end to multi-end communication according to claim 1, wherein conditions that the private label is valid comprise: compliance with rules; in activated state; and objective existence in a physical domain of a signal range.

5. A system for Bluetooth-based multi-end to multi-end communication comprising:
   a module of authorizing and monitoring private data group communication, configured for: obtaining, through a short-term connection-oriented communication, a UUID of a device that needs to receive private data, corresponding the UUID to a private label according to a private label allocation table and storing the UUID in a mapping table within a broadcast host; and looking-up the mapping table to determine if data to be sent contains private information targeted for a specific receiving object group and if the private label is valid; and if yes, proceeding to a module of private communication encryption according to a filtering rule required by the specific receiving object group, otherwise proceeding to a module of Bluetooth broadcast payload sending;
   the module of private communication encryption, configured for: determining whether encryption is required; if encryption is required, then performing dynamical encryption based on the private label and proceeding to the module of Bluetooth broadcast payload sending; and if encryption is not required, proceeding to the module of Bluetooth broadcast payload sending; and
   the module of Bluetooth broadcast payload sending, configured for: encapsulating unencrypted data or encrypted data and broadcasting it.

6. The system for Bluetooth-based multi-end to multi-end communication according to claim 5, wherein the module of Bluetooth broadcast payload sending specifically comprises: performing hosting padding and payload merging in broadcast host protocol reserved extension bits and spare non-reserved bits.

7. The system for Bluetooth-based multi-end to multi-end communication according to claim 5, wherein an encryption scheme in the module of private communication encryption is reflected in a bit of Encrypted Mark Key of a broadcast host protocol which is sent along with the data to be sent.

8. The system for Bluetooth-based multi-end to multi-end communication according to claim 5, wherein conditions that the private label is valid comprise: compliance with rules; in activated state; and objective existence in a physical domain of a signal range.

* * * * *